United States Patent [19]

MacMurdo, Sr.

[11] Patent Number: 5,397,243

[45] Date of Patent: Mar. 14, 1995

[54] ELECTRICAL CORD PROTECTION WRAP AND PLUG COVER

[76] Inventor: Michael MacMurdo, Sr., 27 Arbor Rd., Holbrook, Mass. 02343

[21] Appl. No.: 115,582

[22] Filed: Sep. 3, 1993

[51] Int. Cl.⁶ .............................................. H01R 4/50
[52] U.S. Cl. ................................... 439/136; 439/367; 439/447; 174/135
[58] Field of Search ............... 439/367, 369, 370, 371, 439/445, 447, 750, 588, 592, 136, 501; 174/67, 135, 136

[56] References Cited

U.S. PATENT DOCUMENTS

| | | | |
|---|---|---|---|
| 2,386,000 | 10/1945 | McQuiston | 439/447 OR |
| 4,691,974 | 9/1987 | Pinkerton et al. | 439/367 X |

FOREIGN PATENT DOCUMENTS

| | | | |
|---|---|---|---|
| 0011306 | 6/1913 | United Kingdom | 439/445 |
| 2091498 | 7/1982 | United Kingdom | 439/447 |

Primary Examiner—Larry I. Schwartz
Assistant Examiner—Daniel Wittels
Attorney, Agent, or Firm—Hugh E. Smith

[57] ABSTRACT

A device for wrapping an electrical cord for protective purposes comprising, in combination a tubular elongated member formed with a circular interior surface and a circular exterior surface about a common longitudinal axis to define a wall between the surfaces, a single cut extending through the wall for the length of the elongated member in a spiral configuration, the elongated member being fabricated of a resilient elastomeric material whereby an electrical cord may be inserted into the interior surface by advancing sequential segments of the electrical cord through the slot for protection of the electrical cord.

3 Claims, 4 Drawing Sheets

ELECTRICAL CORD PROTECTION WRAP AND PLUG COVER

BACKGROUND OF THE INVENTION

1. Field of the Invention

The present invention relates to an electrical cord protection wrap and plug cover and more particularly pertains to a tubular elongated member of a resilient elastomeric material with a helical slot for receiving an electrical cord in combination with a tubular extension member for receiving and protecting the plug of the electrical cord, all for protection purposes.

2. Description of the Prior Art

The use of the electrical cord protection wrap and plug cover is known in the prior art. More specifically, protective wraps and covers heretofore devised and utilized for the purpose of protecting electrical cords and plugs are known to consist basically of familiar, expected and obvious structural configurations, notwithstanding the myriad of designs encompassed by the crowded prior art which have been developed for the fulfillment of countless objectives and requirements.

By way of example, U.S. Pat. Nos. 4,454,374 to Pollack and 4,939,778 to Tomberlin disclose sleeves for encompassing an electrical cord basically for decorative purposes.

U.S. Pat. No. 3,900,697 to Yotsugi discloses a cover for electrical cord for improving the insulating capacity of the wire.

Watson in U.S. Pat. No. Des. 296,779 discloses a device for covering coupled ends of extension cords.

Lastly, U.S. Pat. No. 5,011,427 to Martin discloses a device for covering electrical plugs for insuring their securement in receptacles.

In this respect, the protective wraps and covers according to the present invention substantially departs from the conventional concepts and designs of the prior art, and in so doing provides an apparatus primarily developed for the purpose of providing protection for electrical cords and plugs.

Therefore, it can be appreciated that there exists a continuing need for new and improved wraps and covers which can be used with electrical cords and covers for protection. In this regard, the present invention substantially fulfills this need.

SUMMARY OF THE INVENTION

In view of the foregoing disadvantages inherent in the known types of electrical cord protection wrap and plug covers now present in the prior art, the present invention provides an improved wrap and cover construction. As such, the general purpose of the present invention, which will be described subsequently in greater detail, is to provide a new and improved protection for electrical cords and plugs and method which has all the advantages of the prior art and none of the disadvantages.

To attain this, the present invention essentially comprises a device for wrapping an electrical cord and for covering a plug for protective purposes comprising, in combination a tubular elongated member formed with a circular interior surface and a circular exterior surface about a common longitudinal axis to define a wall between the surfaces, the thickness of the wall being between about 25 and 45 percent of the diameter of the exterior surface; a single cut extending through the wall for the length of the elongated member in a spiral configuration with a pitch of between about 80 and 120 percent of the diameter of the exterior surface, the elongated member being fabricated of a resilient elastomeric material selected from the class of resilient elastomeric materials including latex, natural rubber, synthetic rubber and plastics whereby an electrical cord may be inserted into the interior surface by advancing sequential segments of the electrical cord through the slot for protection of the electrical cord; and, a tubular extension member formed as a longitudinal extension of the elongated member with a generally circular interior surface and a generally circular exterior surface about a longitudinal axis coextensive with the longitudinal axis of the elongated member, the interior surface of the extension member being greater than the interior surface of the elongated member and the exterior surface of the extension member being greater than the interior surface of the extension member, the extension member having a first inboard end with a conical configuration coupled with the elongated member and a second outboard end in a flared configuration, the extension member being fabricated of the same resilient elastomeric material as the elongated member whereby the plug of an electrical cord may be inserted within the interior surface by passage through the inboard end and the adjacent portion of the slot before covering the plug.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is another object of the present invention to provide a new and improved electrical cord protection wrap and plug cover which may be easily and efficiently manufactured and marketed.

It is a further object of the present invention to provide a new and improved electrical cord protection wrap and plug cover which is of a durable and reliable construction.

An even further object of the present invention is to provide a new and improved electrical cord protection wrap and plug cover which is susceptible of a low cost of manufacture with regard to both materials and labor, and which accordingly is then susceptible of low prices of sale to the consuming public, thereby making such electrical cord protection wrap and plug cover devices economically available to the buying public.

Still yet another object of the present invention is to provide a new and improved electrical cord protection wrap and plug cover which provides in the apparatuses and methods of the prior art some of the advantages thereof, while simultaneously overcoming some of the disadvantages normally associated therewith.

Still another object of the present invention is to provide a new and improved protect children and animals from electrical shock as may occur through improper contact with electrical wires and plugs.

Yet another object of the present invention is to provide a new and improved to protect electrical wires and plugs from damage from people or machines.

Even still another object of the present invention is to provide a device for wrapping an electrical cord for protective purposes comprising, in combination a tubular elongated member formed with a circular interior surface and a circular exterior surface about a common longitudinal axis to define a wall between the surfaces, a single cut extending through the wall for the length of the elongated member in a spiral configuration, the elongated member being fabricated of a resilient elastomeric material whereby an electrical cord may be inserted into the interior surface by advancing sequential segments of the electrical cord through the slot for protection of the electrical cord.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
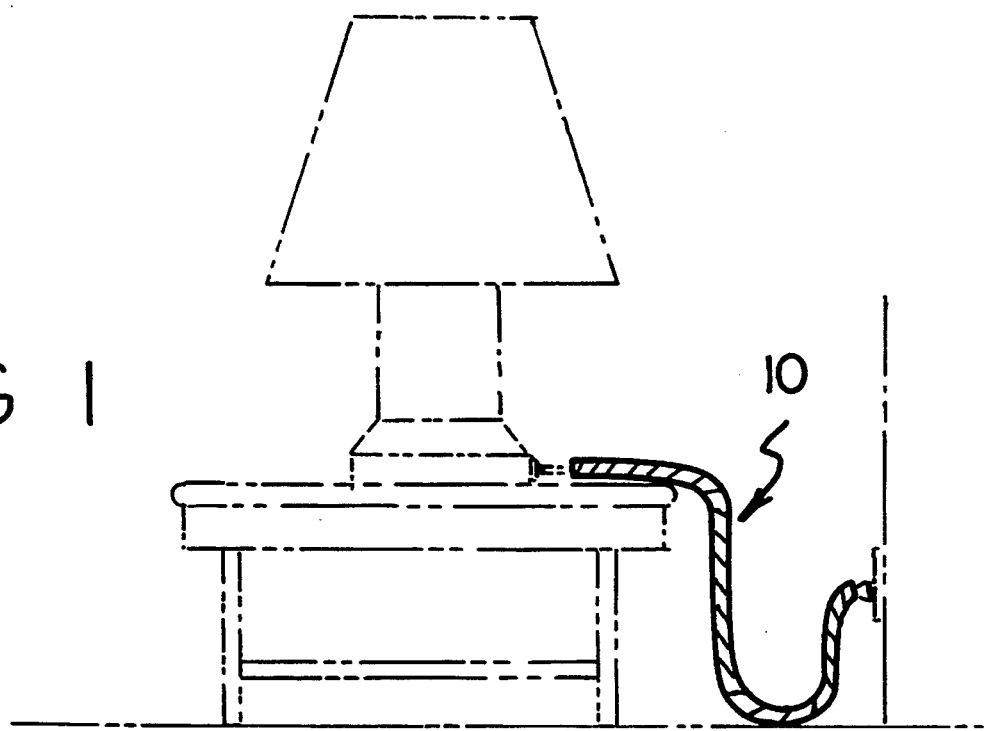
FIG. 1 is an elevational view of the electrical cord protection wrap and plug cover constructed in accordance with the principals of the present invention shown in association with an electrical lamp plugged into a wall outlet and with the electrical cord there between protected by the preferred embodiment of the present invention.

With reference now to the drawings, and in particular to FIG. 1 thereof, a new and improved electrical cord protection wrap and plug cover embodying the principles and concepts of the present invention and generally designated by the reference numeral 10 will be described.

Figure 2:
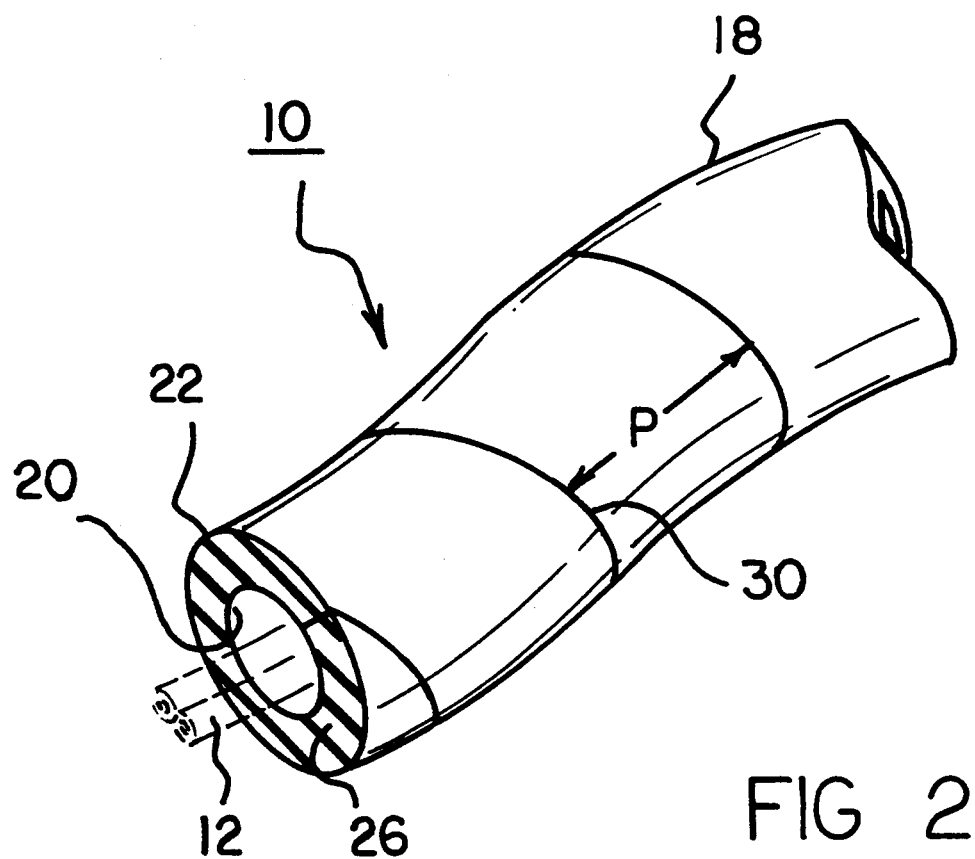
FIG. 2 is a perspective illustration of a portion of the electrical cord protection wrap and plug cover as shown in FIG. 1.
Figure 3:
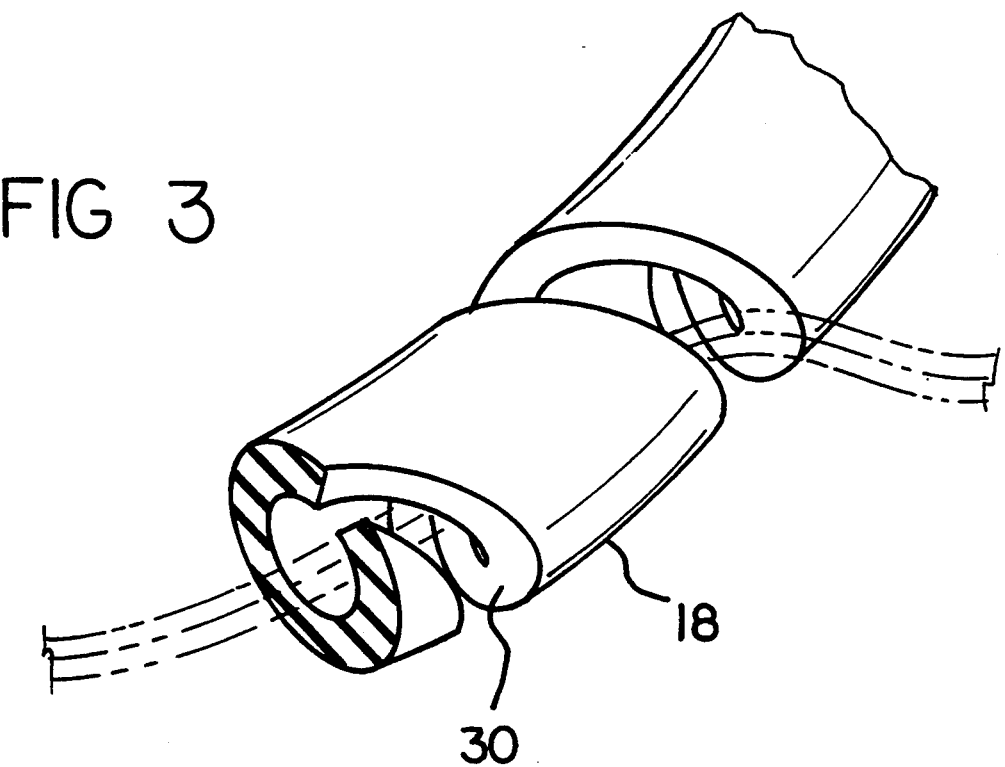
FIG. 3 is a view similar to FIG. 2 but illustrating an electrical cord being inserted into the device.
Figure 4:
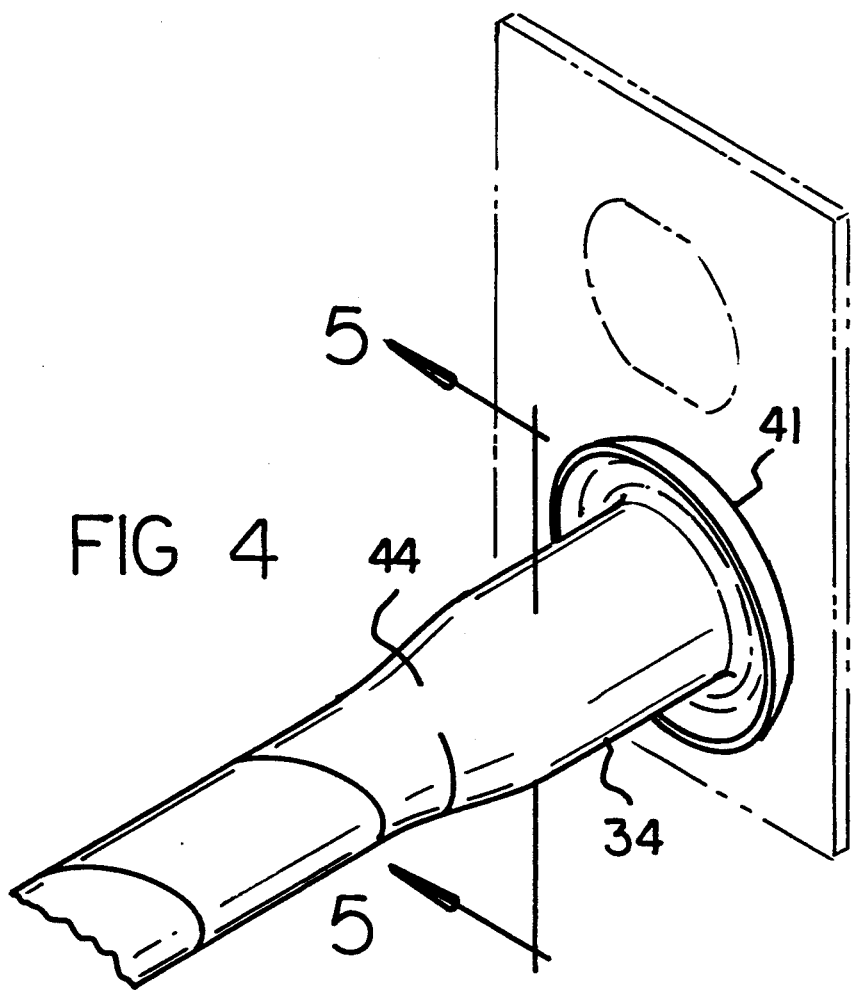
FIG. 4 is a perspective view of one end of the device of the prior figure.

More specifically, it will be noted with the showing of FIGS. 1 and 2, a device 10 for wrapping an electrical cord 12 and for covering a plug 14. Such a device has for its purposes protection, protection for the cord as well as protection for animals and small children who might chew on the cord.

The tubular device 10 includes elongated member 18 formed with a circular interior surface 20 and a circular exterior surface 22 about a common longitudinal axis to define a wall 26 between the surfaces. The thickness of the wall is preferably ¼ inch, between about 25 an 45 percent of the diameter of the exterior surface 22 which is about ⅜ inch.

A single cut 30 forming a slot extends through the wall 26 for the length of the elongated member in a spiral configuration. The spiral has a pitch of between about 80 and 120 percent of the diameter of the exterior surface.

By pitch it is meant the distance along the length of the member between cut segments. This is marked as "P" in FIG. 2. The elongated member is preferably fabricated of a resilient elastomeric material selected from the class of resilient elastomeric materials including latex, natural rubber, synthetic rubber and plastics.

Because of the configuration and materials of the elongated member, an electrical cord may be inserted into the interior surface. This is done by advancing sequential segments of the electrical cord through the slot. Such advancing and inserting is for protection of the electrical cord as well as animals and children.

A further component of the device is a tubular extension member 34. Such member is formed as a longitudinal extension of the elongated member 18. It has a generally circular interior surface and a generally circular exterior surface. Such surfaces are located about a longitudinal axis which is coextensive with the longitudinal axis of the elongated member.

Figure 5:
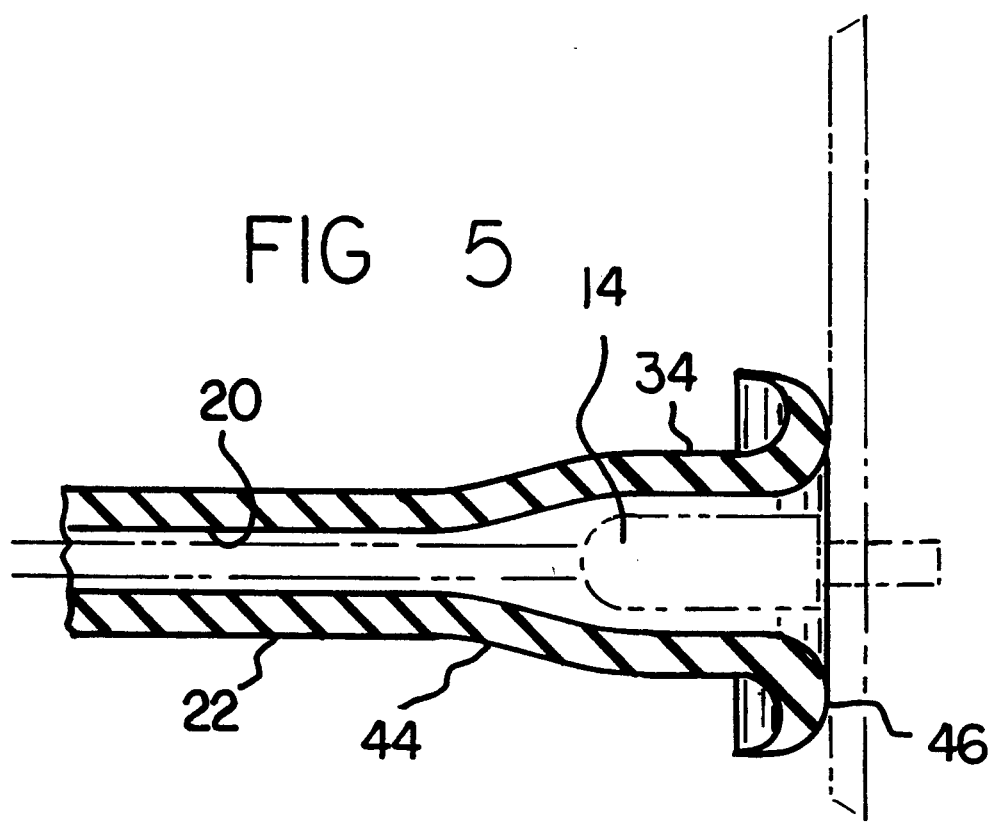
FIGS. 5 and 6 are sectional views of the end of the device shown in FIG. 4 taken along line 5—5 of FIG. 4, one with the plug inserted in the receptacle and FIG. 6 with the plug in anticipation of being inserted into the receptacle.
Figure 6:
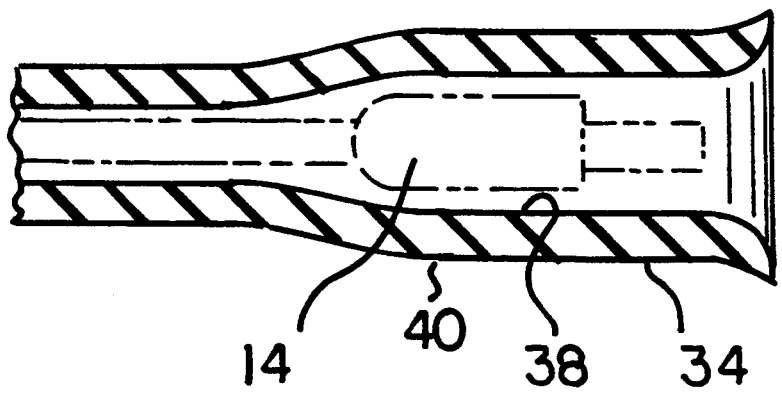

The interior surface 38 of the extension member 34 is greater than the interior surface 20 of the elongated member. The exterior surface 40 of the extension member is greater than the interior surface 38 of the extension member. The extension member 34 has a first or inboard end 44 with a conical configuration coupled with the elongated member 18 and a second or outboard end 46 in a flared configuration. Note FIG. 5 and 6. The extension member 34 is fabricated of the same resilient elastomeric material as the elongated member. Due to the shape and materials of the elongated member, the plug 14 of an electrical cord 12 may be inserted within the interior surface 38 by passing it through the inboard end 44 and the adjacent portion of the slot 30 before covering the plug 14.

Figure 7:
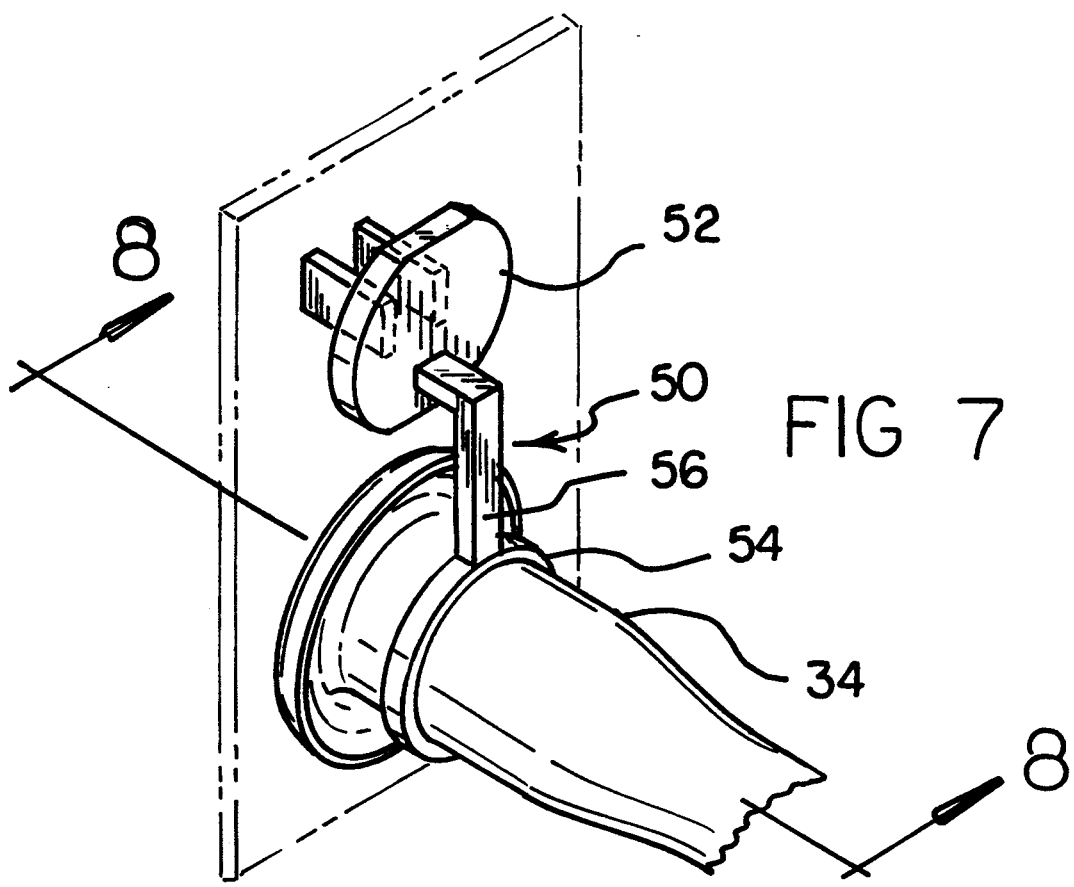
FIG. 7 is a perspective illustration of an alternate embodiment of the invention; and, FIG. 8 is a sectional view the showing of FIG. 7 taken along line 8—8 of FIG. 7.
Figure 8:
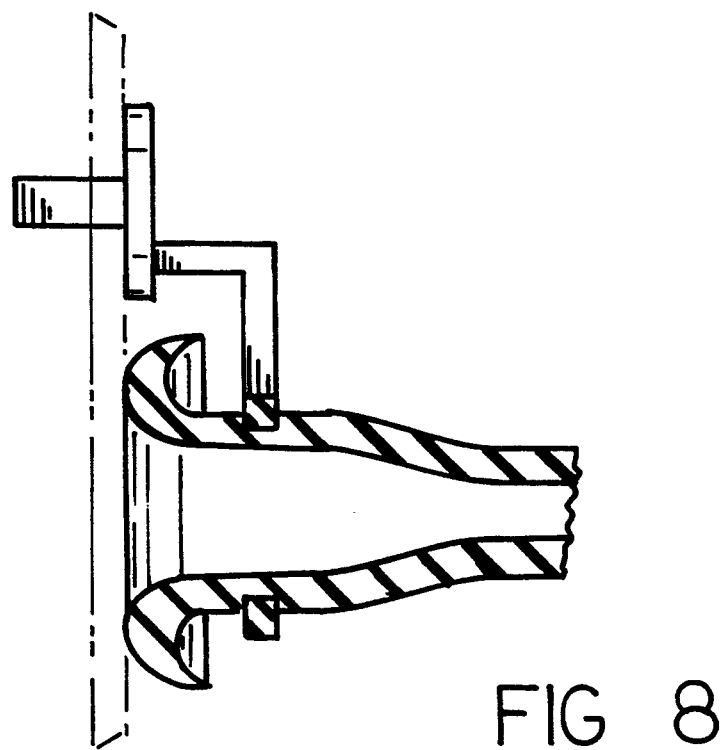

FIGS. 7 and 8 show an alternate embodiment of the invention. FIG. 7 is a perspective view of the alternate embodiment coupled to the exterior surface of the extension member 34. The additional member forming the alternate embodiment includes a socket cover 50. The socket cover 50 has a generally conventional component 52 of an electrically insulated material with prongs inserted into the receptacle to be covered. In addition, a ring 54 also of an electrically insulating material is located around a central extent of the extension member. Therebetween is an inverted L-shaped coupling component 56 to retain the socket cover 52 at a proper elevational orientation with respect to the extension member as a function of the receptacle. Such additional member of this final embodiment is readily attached to or removed from the device of the embodiment of the prior Figures for extending the utility of the system.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A device for wrapping an electrical cord and for covering a plug for protective purposes comprising, in combination:

a tubular elongated member having a length and formed with a circular interior surface having a first diameter and a circular exterior surface having a second diameter, the surfaces having a common longitudinal axis to define a wall between the surfaces, the thickness of the wall being between about 25 and 45 percent of the diameter of the exterior surface;

a single cut extending through the wall for the length of the elongated member in a spiral configuration with a pitch of between about 80 and 120 percent of the diameter of the exterior surface, the elongated member being fabricated of a resilient elastomeric material selected from a class of resilient elastomeric materials including latex, natural rubber, synthetic rubber and plastics whereby an electrical cord is insertable interior of the interior surface by advancing sequential segments of the electrical cord through the cut for protection of the electrical cord; and a tubular extension member formed as a longitudinal extension of the elongated member with a generally circular interior surface and a generally circular exterior surface about a longitudinal axis coextensive with the longitudinal axis of the elongated member, the interior surface of the extension member being greater than the interior surface of the elongated member and the exterior surface of the extension member being greater than the interior surface of the extension member, the extension member having a first inboard end with a conical configuration coupled with the elongated member and a second outboard end in a flared configuration, the extension member being fabricated of a resilient elastomeric material as the elongated member whereby a plug of an electrical cord is insertable interior of the interior surface by passage through the inboard end and the adjacent portion of the slot.

2. A device for wrapping an electrical cord for protective purposes comprising:

a tubular elongated member formed with a circular interior surface of a first fixed radius and a circular exterior surface of a second fixed radius, the surfaces having a common longitudinal axis to define a wall between the surface, a single cut extending through the wall for the length of the elongated member in a spiral configuration, the elongated member being fabricated of a resilient elastomeric material whereby an electrical cord is insertable interior of the interior surface by advancing sequential segments of the electrical cord through the slot for protection of the electrical cord; and further including a tubular extension member formed as a longitudinal extension of the elongated member with a circular interior surface and a exterior surface about a longitudinal axis coextensive with the longitudinal axis of the elongated member, the interior surface of the extension member being greater than the interior surface of the elongated member and the exterior surface of the extension member being greater than the interior surface of the extension member, the extension member having a first inboard end with a conical configuration coupled with the elongated member and a second outboard end in a flared configuration, the extension member being fabricated of the same resilient elastomeric material as the elongated member whereby a plug of an electrical cord is insertable interior of the interior surface by passage through the inboard end and the adjacent portion of the slot.

3. The device as set forth in claim 2 and further including a socket cover rotatably coupled to the exterior surface of the tubular extension.

* * * * *